Jan. 5, 1937.    R. B. BEISEL    2,067,041
ENGINE COOLING MEANS
Filed June 15, 1935    3 Sheets-Sheet 1
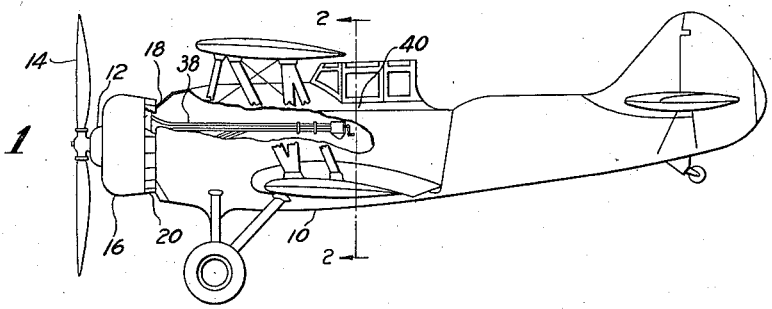
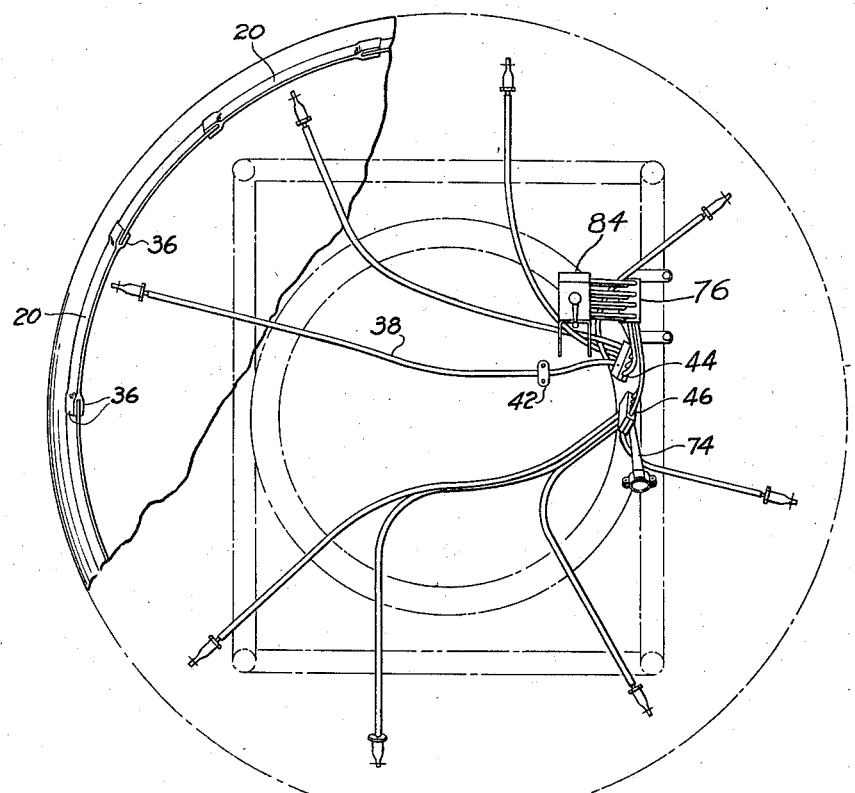
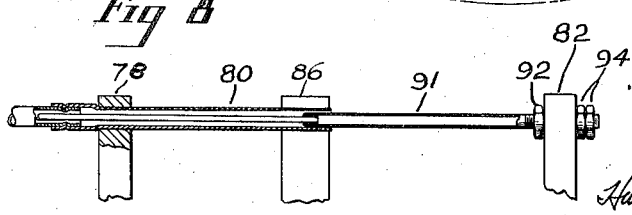
INVENTOR.
BY *Rex B. Beisel*
*Harris Y. Luther* ATTORNEY Jan. 5, 1937.  R. B. BEISEL  2,067,041
ENGINE COOLING MEANS
Filed June 15, 1935  3 Sheets-Sheet 2
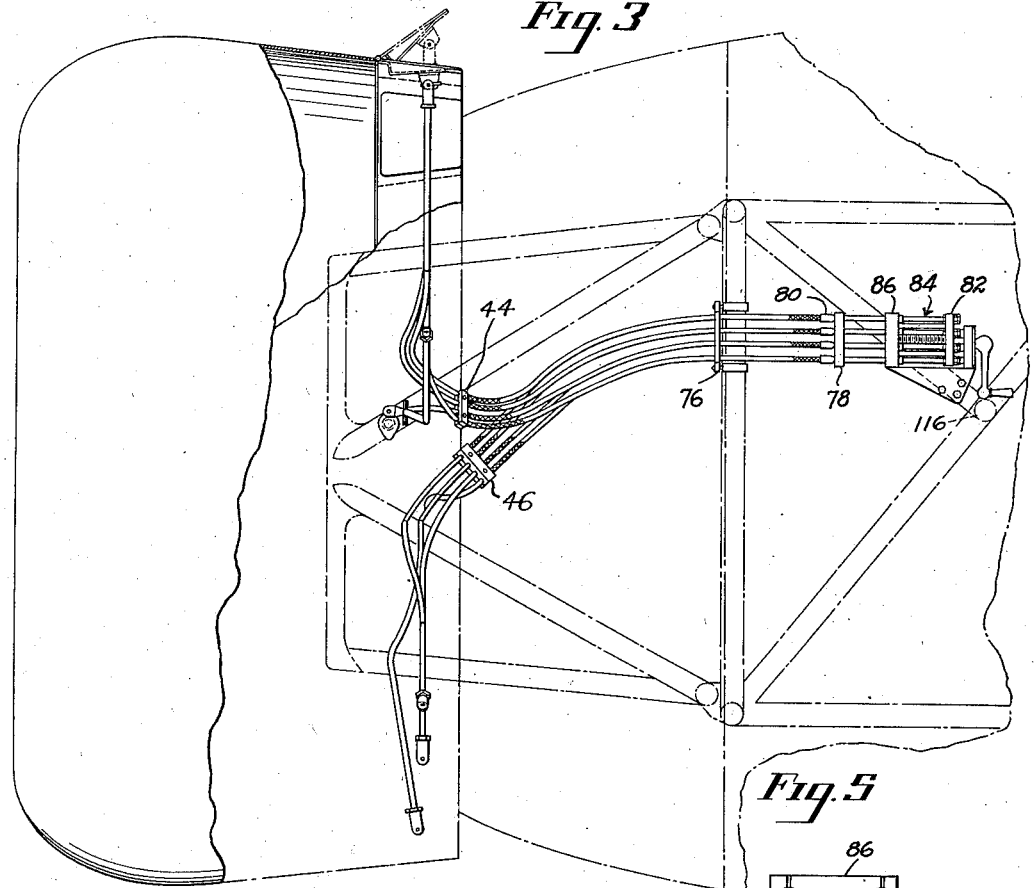
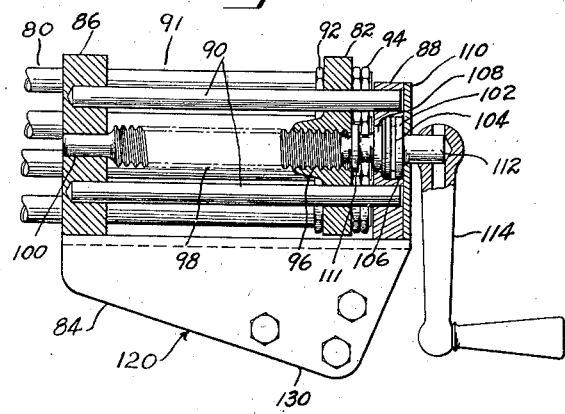
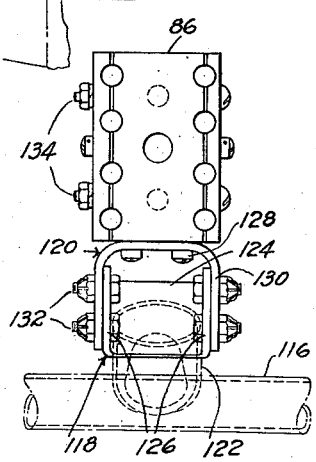
INVENTOR.
Rex B. Beisel
BY
Harris G. Luther ATTORNEY Jan. 5, 1937.    R. B. BEISEL    2,067,041
ENGINE COOLING MEANS
Filed June 15, 1935    3 Sheets-Sheet 3

INVENTOR.
BY *Rex B. Beisel*
*Harris G. Luther* ATTORNEY

Patented Jan. 5, 1937

2,067,041

UNITED STATES PATENT OFFICE 2,067,041

ENGINE COOLING MEANS

Rex B. Beisel, West Hartford, Conn., assignor to United Aircraft Corporation, East Hartford, Conn., a corporation of Delaware Application June 15, 1935, Serial No. 26,877

16 Claims. (Cl. 123—171)

This invention relates to improvements in engine cooling means and has particular reference to improved means for controlling the flow of air past the cooling surface of a cowled air cooled engine.

One object of the invention lies in the provision of means for manually adjusting a series of air controlling flaps mounted at the trailing edge of an engine cowl.

A further object resides in the provision of manually operable means for rapidly and easily adjusting air controlling flaps mounted at the trailing edge of an engine cowl and causing all of the flaps to move in unison to regulate the extent of gill opening to the same degree entirely around the cowl.

The accompanying drawings illustrate a suitable mechanical embodiment of what is now considered to be the preferred form of the invention, the drawings, however, are for the purpose of illustration only and are not to be taken as limiting the invention, the scope of which is to be measured entirely by the scope of the appended claims.

Figure 6:
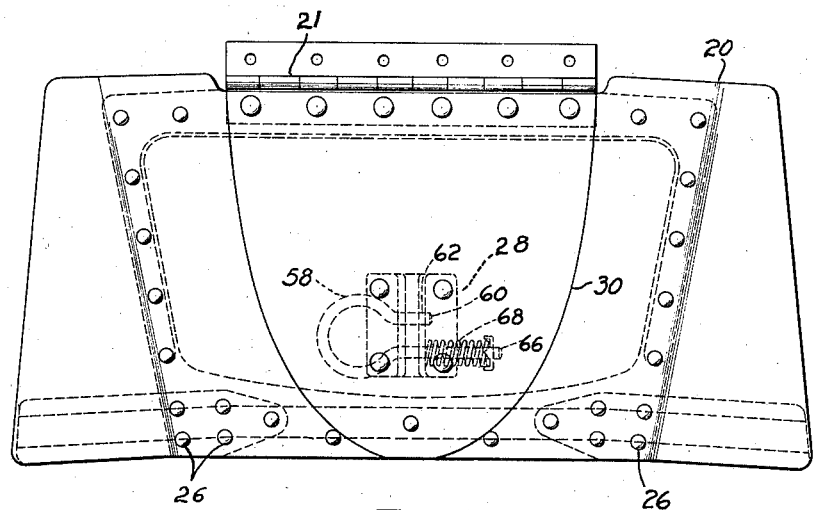
Figure 7:
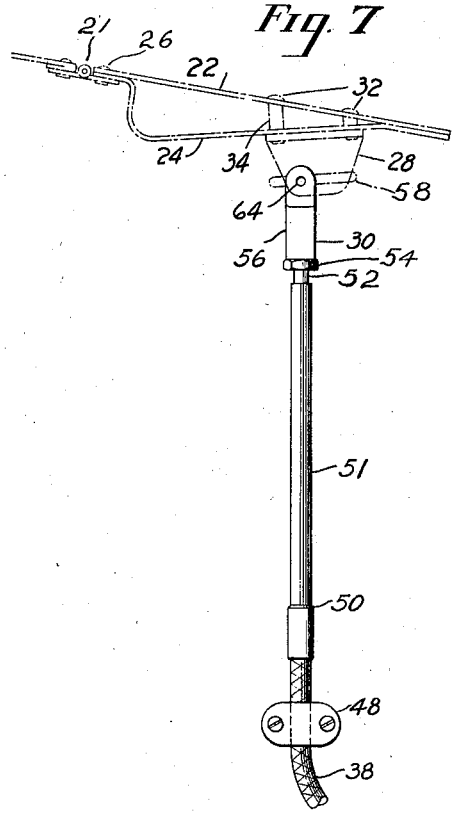

In the accompanying drawings which form a part of this application and in which like numerals are used to designate similar parts throughout, Fig. 1 is a side elevational view of a conventional form of aircraft, a portion thereof being broken away to illustrate the application thereto of a device constructed according to the idea of this invention. Fig. 2 is a sectional view on an enlarged scale on the line 2—2 of Fig. 1, looking in the direction of the arrows, showing a device constructed according to the idea of this invention applied to the air controlling flaps on the engine cowl illustrated in Fig. 1. Fig. 3 is a view on an enlarged scale of a fragmentary portion of the airplane illustrated in Fig. 1, certain parts thereof being shown in section, and other parts being broken away to illustrate in detail the application of the improved cowl flap control means forming the subject matter of this invention. Fig. 4 is a vertical sectional view on an enlarged scale of the manually operable crank and screw device illustrated in Fig. 3. Fig. 5 is an end elevational view of the left hand end of the crank and screw device illustrated in Fig. 4. Fig. 6 is a plan view of one of the cowl flaps forming a part of this invention, Fig. 7 is a detail view on an enlarged scale showing the manner of attaching one of the cowl flap actuators to the associated cowl flap. Fig. 8 is a vertical sectional view showing the construction of one of the ferrules 80 and associated strut member 91 illustrated in Fig. 4.

Referring to the drawings in detail, the numeral 10 generally indicates the fuselage of an airplane upon the front end of which is mounted an engine 12 which operates a propeller 14 for supplying the tractive force for the propulsion of the airplane. While the drawings illustrate a single engine type of airplane in which the engine is mounted upon the forward end of the fuselage, it is to be understood that the engine may be mounted upon any other suitable supporting structure such as the wing of the airplane and that there may be one or a plurality of engines without in any way exceeding the scope of the invention.

The engine 12 is surrounded by a stream lined cowl 16 to reduce the amount of force necessary to drive the engine and the fuselage through the air when the airplane is in flight. While the improved engine cooling means may be used with various types of engines, I have illustrated the use of the same in combination with an air cooled engine of the radial type commonly used to furnish power for various types of aircraft. As the engine itself may be of a conventional construction and forms no specific part of this invention, it is believed that a description thereof is not necessary for the purpose of this disclosure.

The cowl 16 is rigidly mounted upon the engine and is open at both ends so that air currents created by the slip stream of the propeller 14 and by the forward motion of the airplane when in flight, may flow through the cowl and past the cooling surfaces of the engine to carry away from the engine the excess heat developed during power operation. The trailing edge of the cowl is spaced from the forward end or shoulder 18 of the fuselage 10 to provide an annular slot known to the art as a gill opening through which the engine cooling air is vented from the interior of the cowl. As the cooling requirements of the engine are not the same at all times, but vary in accordance with the temperature and humidity of the cooling air and with the power output requirements on the engine, and as the quantity of cooling air flowing past the engine tends to vary with the air speed of the airplane, it has been found desirable to provide means for regulating the amount of cooling air flowing past the cooling surfaces of the engine so that the engine temperature may be maintained at the proper value for optimum operating conditions. It has been found that the volume of air flowing through the gill opening between the trailing edge of the cowl 16 and the front end 18 of the fuselage 10 may be materially increased by providing a flare at the trailing edge of the cowl. Such a flare may conveniently be provided by means of a series of flaps 20 hinged at their forward ends either to the trailing edge of the cowl itself or to a supporting member positioned at the trailing edge of the cowl, which supporting member may provide a reinforcement for the cowl trailing edge as well as furnish a support for the flap hinges 21. By adjusting the flaps 20 about their hinges the inclination of the flare at the trailing edge of the cowl and the extent of the gill opening may be readily controlled to accurately regulate the amount of cooling air passing the cooling surfaces of the engine. In order that the stream of cooling air may be maintained uniform around the entire circumference of the engine, it is necessary that all of the flaps of the series should move in unison when adjusted and should move to the same extent so that the area of the gill opening will be substantially constant around the entire circumference of the annular cowl.

In order to render the flaps 20 rigid to resist the bending and twisting forces exerted upon them by the air stream flowing past the cowl 16 and also to assist these flaps in resisting the vibration or flutter set up by the eddying of the air currents flowing over the edges of the flaps when extended the flaps are built up into strongly reinforced elements as illustrated in Figs. 6 and 7. The main portion of each flap consists of a substantially rectangular plate 22 formed of sheet metal of a suitable, strong, light material such as duralumin. This plate 22 is reinforced by a box member 24 secured to the underside thereof by suitable means such as the rivets 26. A clip 28 for connecting the flap actuator, generally indicated at 30 in Fig. 7, to the flap is secured to the underside of the box member 24 by means of rivets 32 and spacers 34, surrounding these rivets 32 between the plate 22 and the box member 24 to further reinforce the flap construction.

When the flaps are in the closed position illustrated in Figs. 1 and 2 the adjoining edges of adjacent flaps are in substantial contact, thus forming a substantially continuous ring of truncated conical form at the trailing edge of the cowl. Alternate flaps are provided at their opposite edges with substantially straight or planar extensions 36 illustrated in Fig. 2 which overlie both sides of the adjoining straight edge of each intermediate flap to provide guides for the intermediate flap edges so that as the flaps are swung about the hinges 21 at their forward ends the adjoining edges of the flaps will remain in alignment with each other. The above described arrangement of a series of separate flaps and the guide connections between the various flaps of the series serve to transmit any force or motion imparted to one flap to the remaining flaps of the series so that the flaps will always move in unison to substantially the same degree to maintain the extent of the gill opening substantially uniform throughout its entire circumference.

In the form of the invention herein illustrated, the flaps are adjusted to different angular positions by means of a plurality of push and pull members 38 each of which comprises a resilient rod or cable slidable in a flexible casing so that a force imparted to the cable at one end of the casing will be transmitted to the end of the cable at the opposite end of the casing in substantially undiminished effect. Of these push and pull members all of the encased cables 38 lead from a position within the operating compartment 40 of the airplane to positions adjacent to certain of the flaps, the last named positions being disposed at substantially equal intervals around the circumference of the series of flaps as particularly illustrated in Fig. 2. The casing of each of the members 38 is secured at intervals along its length to convenient fixed portions of the airplane by suitable clips such as that indicated at 42, and clamp blocks 44 and 46 illustrated in Fig. 2, and, adjacent to its flap end, each of the members is anchored to a convenient fixed portion of the airplane by suitable anchoring clip as indicated at 48 in Fig. 7. The flexible casing of each push and pull member such as a Bowden wire or Arens control device 38 terminates a short distance beyond the anchor 48 as indicated at 50 in Fig. 7 and has secured to its end a tube or ferrule 51 which extends beyond the anchor member. A rigid strut or link member in the form of a rod or tube 52 is secured to the end of the casing included wire or cable and is slidably extended through the ferrule 51 to receive the force transmitted through the cable. At its end remote from the end of the cable, the strut member 52 is connected by means of an adjustable connection 54 to a clevis or lug 56 which is pivotally connected to the clip 28 by means of a looped pin 58 having one prong 60 extending through aligned apertures 62 and 64 in the clip and the lug and having a second prong 66 extending through parallel apertures in the clip and spring urged by means of a coiled compression spring 68 in a direction to maintain the prong 60 in engagement in the apertures 62 and 64, the spring 68 being sufficiently compressible so that the prong 60 may be readily disengaged from the lug 56 to constitute a quick detachable connection between the lug and the flap 20.

It is obvious that as many actuating members 38 may be used as is desired or necessary from one to each of the flaps 20 to a minimum of only one attached to one of the flaps 20. In the form of the invention illustrated the number of such members is somewhat less than one half of the number of flaps, there being 8 actuating members and 18 flaps. The actuating members are divided into two groups of 4 each, the upper group extending rearwardly from the connections with the upper flaps through the clamp block 44 and the lower group extending rearwardly from their connections with the lower flaps through the clamp block 46. The clamp blocks 44 and 46 are rigidly secured to fixed parts of the airplane by suitable means such as the brackets one of which is indicated at 74.

From the clamps 44 and 46. the two groups of push and pull devices are led to a bracket 76 particularly illustrated in Fig. 3 where they are gathered together and arranged in two parallel vertical groups in which the members of each group are equally spaced apart. From the bracket 76 the actuating cables are led backwardly in a substantially straight line to a plate 78. The casings of the flap actuating members 38 are terminated just short of the plate 78 and have their ends crimped into the forward ends of respective ferrules 80 preferably formed of brass tubes. The ferrules 80 extend through the spacing plate 78 to operative engagement with a manually operable device 84 to which they are attached by having their rearward ends clamped in the forward abutment plate 86 of the manually operable device.

Referring particularly to Fig. 4 it will be observed that the sliding plate 82 of the manually operable device 84 is disposed between forward abutment plate 86 and a rear abutment plate 88 and is constrained to reciprocate in a straight line between these two abutments by means of a plurality of guide bars 90 anchored at their ends in the plates 86 and 88 and extending slidably through the plate 82. The cables of the flap actuating members 38 have attached to their ends strut members 91 which extend slidably through the ferrules 80 and are rigidly connected at their ends to the slidable plate 82 by suitable means such as the nuts 92 and 94 disposed on opposite sides of the plate 82. The plate 82 is provided with a centrally located screw threaded aperture 96 through which extends a screw threaded shaft 98 having a rotatable bearing 100 at the front abutment 86 and a rotatable thrust bearing 102 in the rear abutment 88. The rotatable thrust bearing comprises a collar 104 formed on the screw threaded shaft 98 and fitting into a countersunk aperture 106 provided in the abutment 88 so that the shoulder 108 of the aperture receives the thrust in one direction and an apertured plate 110 secured to the rear face of the abutment 88 receives the thrust in the opposite direction. The shaft 98 is provided with a stop collar 111 on one side of the thrust bearing for limiting the movement of the slide plate 82 and on the other side of the thrust bearing has a reduced extension 112 extending through the plate and upon which is non-rotatably secured a hand crank 114 by means of which the shaft 98 may be rotated. As the shaft 98 is restrained against axial movement relative to abutments 86 and 88, it will be observed that the rotation of the shaft by the crank 114 will cause the slidable plate 82 to move along the guides 90 between the abutments 86 and 88 in one direction or the other depending upon the direction of rotation of the crank 114. As the plate 82 moves along the guides 90 it moves the struts 91 and through them the cables of the flap actuating members 38 and as the casings of these members are rigidly connected to the ferrules 80, this movement of the plate 82 will push or pull the cables through the casings to apply force to the flaps 20 to swing them about their hinged connections at the trailing edge of the cowl to extend or retract the flaps and thereby vary the extent and the induction effect of the gill opening between the trailing edge of the cowl and the forward end of the fuselage 10.

The manual actuating device 84 is fixedly secured upon one of the members 116 of the fuselage frame by means of a pair of cooperating bracket members 118 and 120. The bracket member 118 consists of a short tube member 122 welded or otherwise suitably secured to the frame member 116 at one end and provided at its outer end with a U-shaped member 124 having a pair of upstanding apertured ears 126. The bracket member 120 is a substantially channel shaped member having an apertured web portion to which the abutments 86 and 88 are secured by suitable means such as the screws 128, and a pair of apertured tapered flange portions 130 which overlie the ears 126 to which they are secured by suitable means such as the bolts 132.

The abutment 86 is divided into three vertical portions along planes passing through the centers of the apertures through which the ferrules 80 extend and the outer portions of this member are secured to the intermediate portion by adjustable means such as the screws 134 so that the members may be clamped together to provide a frictional contact for the ferrules extending therethrough.

While the accompanying drawings illustrate a specific mechanical embodiment of the idea of the invention which is described in detail in the accompanying specification, it is to be understood that the invention is not limited to the specific embodiment so illustrated and described, but that such changes in the size, shape and arrangement of parts may be resorted to as come within the scope of the sub-joined claims.

As the invention has now been set forth and particularly described so that others skilled in the art may clearly understand same, what it is desired to secure by Letters Patent is as follows:

1. In combination with an engine driven vehicle and an engine therefor, an engine cooling means including a series of adjustable flaps hingedly mounted adjacent to the rear end of said engine, means for manually adjusting said flaps comprising, a plurality of push and pull members each including a flexible casing anchored to fixed portions of said vehicle and a cable slidable in each casing and connected at one end to one of said flaps, and a manually operable device including a fixed abutment for receiving the ends of said casings remote from said flaps, a movable plate member for receiving the ends of said cables remote from said flaps and manually operable means for removing said plate member relative to said abutment.

2. In combination with an engine driven vehicle and an engine therefor, an engine cooling means including a series of adjustable flaps hingedly mounted adjacent to the rear end of said engine, means for manually adjusting said flaps comprising, a plurality of push and pull members each including a flexible casing anchored to fixed portions of said vehicle and a cable slidable in each casing and connected at one end to one of said flaps, and a manually operable device including a fixed abutment for receiving the ends of said casings remote from said flaps, a movable plate member for receiving the ends of said cables remote from said flaps, and a manually rotatable screw threaded shaft for moving said plate member relative to said abutment.

3. In combination with an engine driven vehicle and an engine therefor, an engine cooling means including a series of adjustable flaps hingedly mounted adjacent to the rear end of said engine, means for manually adjusting said flaps comprising, a plurality of push and pull members each including a flexible casing anchored to fixed portions of said vehicle and a cable slidable in each casing and connected at one end to one of said flaps, and a manually operable device including a pair of fixed spaced apart abutments, means securing the ends of said casings remote from said flaps to one of said fixed abutments, a plate member movable between said abutments, means connecting the ends of said cables remote from said flaps to said movable plate member, and a screw threaded shaft carried by said abutments and threadedly engaged with said movable plate member for moving said plate member between said abutments upon rotation of said shaft.

4. In combination with an engine driven vehicle and an engine therefor, an engine cooling means including a series of adjustable flaps hingedly mounted adjacent to the rear end of said engine, means for manually adjusting said flaps comprising, a plurality of push and pull members each including a flexible casing anchored to fixed portions of said vehicle and a cable slidable in each casing and connected at one end to one of said flaps, and a manually operable device including a pair of fixed spaced apart abutments, means securing the ends of said casings remote from said flaps to one of said abutments, a movable plate member between said abutments, means securing the ends of said cables remote from said flaps to said movable plate member, a screw threaded shaft carried by said abutments and having screw threaded engagement with said movable plate member to move said plate member between said abutments upon rotation of said shaft and a thrust bearing in the other of said abutments for restraining said screw threaded shaft against axial movement.

5. In combination with an engine driven vehicle and an engine therefor, an engine cooling means including a series of adjustable flaps hingedly mounted adjacent to the rear end of said engine, means for manually adjusting said flaps comprising, a plurality of push and pull members each comprising a flexible casing anchored to fixed portions of said vehicle and a cable slidable in each casing and connected at one end to one of said flaps, and a manually operable device including a pair of fixed spaced apart abutments, means securing the ends of said casings remote from said flaps to one of said abutments, a plate member movable between said abutments, means for securing the ends of said cables remote from said flaps to said movable plate member, a screw threaded shaft rotatably carried by said abutments and having screw threaded engagement with said movable plate to move said plate between said abutments upon rotation of said shaft, and a crank on one end of said shaft for manually rotating the shaft.

6. In combination with an engine driven vehicle and an engine therefor, an engine cooling means including a series of adjustable flaps hingedly mounted adjacent to the rear end of said engine, means for manually adjusting said flaps comprising, a plurality of push and pull members each comprising a flexible casing anchored to fixed portions of said vehicle and a cable slidable in each casing and connected at one end to one of said flaps, and a manually operable device including a pair of fixed spaced apart abutments, means connecting the ends of said casings remote from said flaps with one of said abutments, a plate member movable between said abutments, means connecting the ends of said cables remote from said flaps to said movable plate member, a screw threaded shaft rotatably carried by said abutments and having screw threaded engagement with said movable plate for moving the same between said abutments upon rotation of said shaft and a pair of guide members secured at their ends to said abutments and extending slidably through said movable plate member in its movements between said abutments.

7. In combination with an engine driven vehicle and an engine therefor, an engine cooling means comprising a series of adjustable flaps hingedly mounted adjacent to the rear end of said engine, means for manually adjusting said flaps comprising, a plurality of push and pull members each comprising a flexible casing anchored to fixed portions of said vehicle and a cable slidable in each casing and connected at one end to one of said flaps and a manually operable device including a pair of fixed spaced apart abutments, a plurality of ferrules each secured at one end to the end of one of said casings remote from said flaps and secured at their opposite ends to one of said fixed abutments, a strut member in each ferrule secured at one end to the end of the respective cable and projecting beyond the ends of the associated ferrules, and a movable plate member between said abutments secured to the projecting ends of said strut members, a screw threaded shaft rotatably carried by said fixed abutments and a screw threaded engagement with said movable plate member for moving said plate member between said abutments upon rotation of said shaft.

8. In combination with a series of adjustable flaps hingedly secured to a curved support and arranged in side by side relation, extensions on the edges of alternate flaps overlying adjoining edges of the intermediate flaps to constitute slidable guides for the adjoining edges of said flaps to constrain all of the flaps of said series to move in unison, and a manually actuatable device for adjusting said flaps.

9. In combination with a series of adjustable flaps hingedly secured to a curved support and arranged in side by side relation, extensions on the edges of alternate flaps overlying adjoining edges of the intermediate flaps to constitute slidable guides for the adjoining edges of said flaps to constrain all of the flaps of said series to move in unison, and a manually actuatable device comprising, a plurality of push and pull devices operatively connected with some of said flaps for adjusting said flaps about their hinge supports.

10. In combination with a series of adjustable flaps hingedly secured to a curved support and arranged in side by side relation, extensions on the edges of alternate flaps overlying the adjoining edges of the intermediate flaps to constitute slidable guides for the adjoining edges of said flaps constraining all of the flaps of said series to move in unison, and a manually actuatable device for adjusting said flaps comprising, a plurality of push and pull devices connected to respective flaps disposed at substantially equally spaced intervals and a single manually operable device for actuating all of said push and pull devices to adjust said flaps.

11. In combination with a series of adjustable flaps hingedly secured to a curved support and arranged in side by side relation, extensions on the edges of alternate flaps overlying both sides of the adjoining edges of the intermediate flaps to constitute slidable guides for the adjoining edges of said flaps to constrain all of the flaps of said series to move in unison and manually actuatable devices for adjusting said flaps.

12. In combination with an engine cowl, a series of adjustable flaps hinged adjacent to the trailing edge of said cowl each flap comprising, a substantially rectangular outer member and a box-like reinforcing member secured to the inner side of said outer member, a clip secured to said reinforced member and a manually operable push and pull device for adjusting said flap secured to said flap by said clip.

13. In combination with an engine cowl, a series of adjustable flaps hinged adjacent to the trailing edge of said cowl each flap comprising a substantially rectangular outer member and a box-like reinforcing member secured to the inner side of said outer member, a clip secured to said reinforcing member, spacers between said outer member and said reinforcing member opposite said clip, and a manually operable push and pull device for adjusting said flap secured to said flap by said clip.

14. In combination with an engine cowl, a series of adjustable flaps hinged adjacent to the trailing edge of said cowl each flap comprising a substantially flat rectangular outer member formed of sheet metal, and a box-like sheet metal reinforcing member secured to the inner side of said outer member, a hinge plate secured to said members along one edge thereof, and a clip secured to said reinforcing member for connecting said flap with a manually actuatable flap adjusting device.

15. In combination with an engine cowl, a series of adjustable flaps hinged adjacent to the trailing edge of said cowl, a manually operable flap adjusting device fixed in a position remote from said flaps, and a plurality of flexible push and pull members connecting said manually operable device with said flaps for adjusting said flaps upon operation of said manually operable device.

16. In combination with an engine cowl, a series of adjustable flaps hinged adjacent to the trailing edge of said cowl, and a manually operable device comprising a fixed member, a movable member, and a rotatable screw threaded shaft for moving said movable member relative to said fixed member, and a plurality of flexible push and pull members each comprising a flexible casing connected to said fixed member and a flexible cable slidable in its respective casing and connected to said movable member for adjusting said flaps upon actuation of said manually operable device.

REX B. BEISEL.